Oct. 12, 1948.           H. T. KELSH           2,451,031
MAP MAKING AND PROJECTION INSTRUMENT
Filed May 15, 1946           5 Sheets-Sheet 2
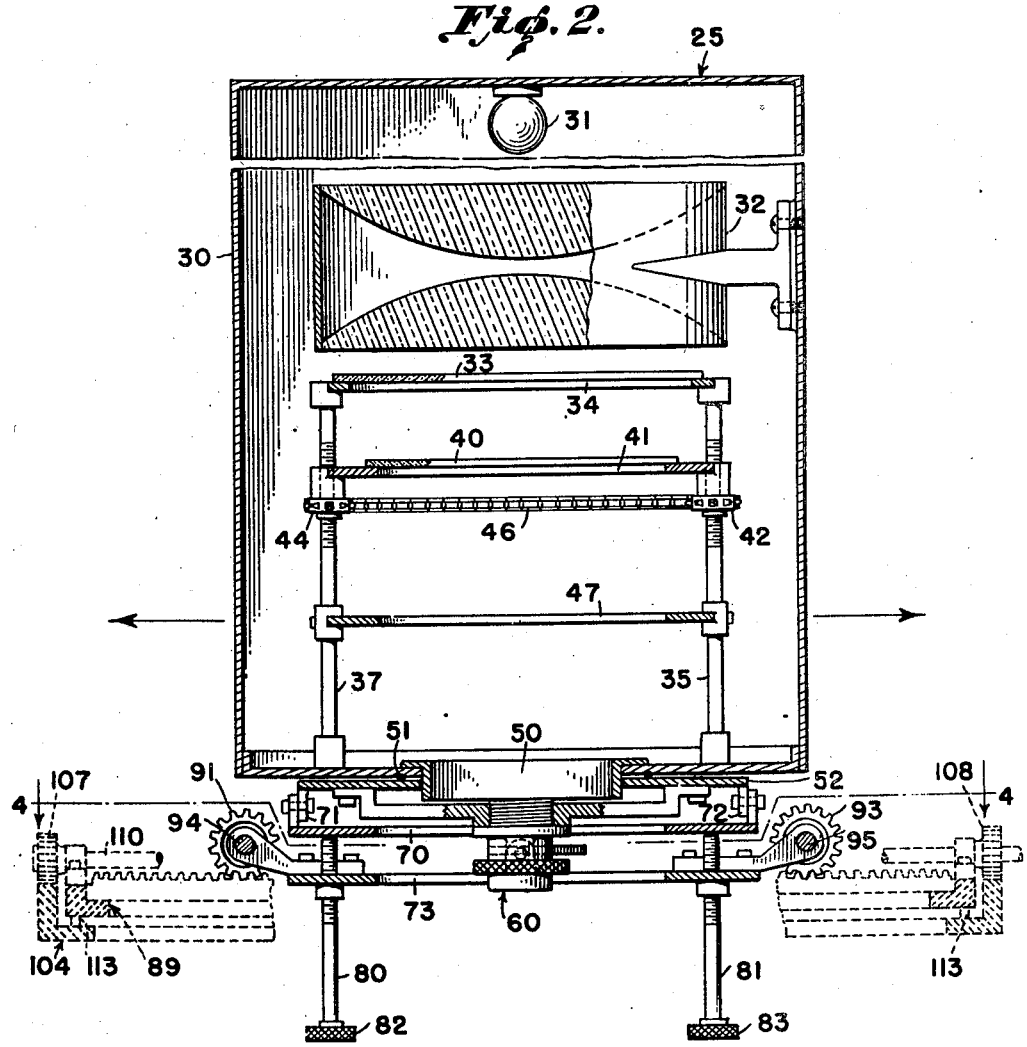
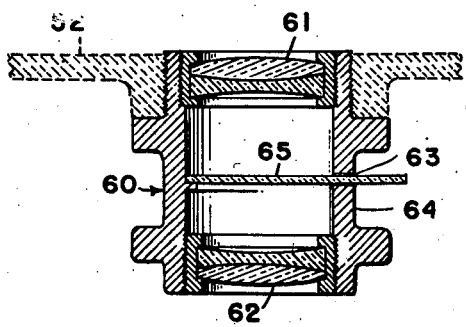
Inventor
H. T. KELSH
By H. N. Foss
L. A. Seequist
Attorney Oct. 12, 1948.  H. T. KELSH  2,451,031
MAP MAKING AND PROJECTION INSTRUMENT
Filed May 15, 1946  5 Sheets-Sheet 3

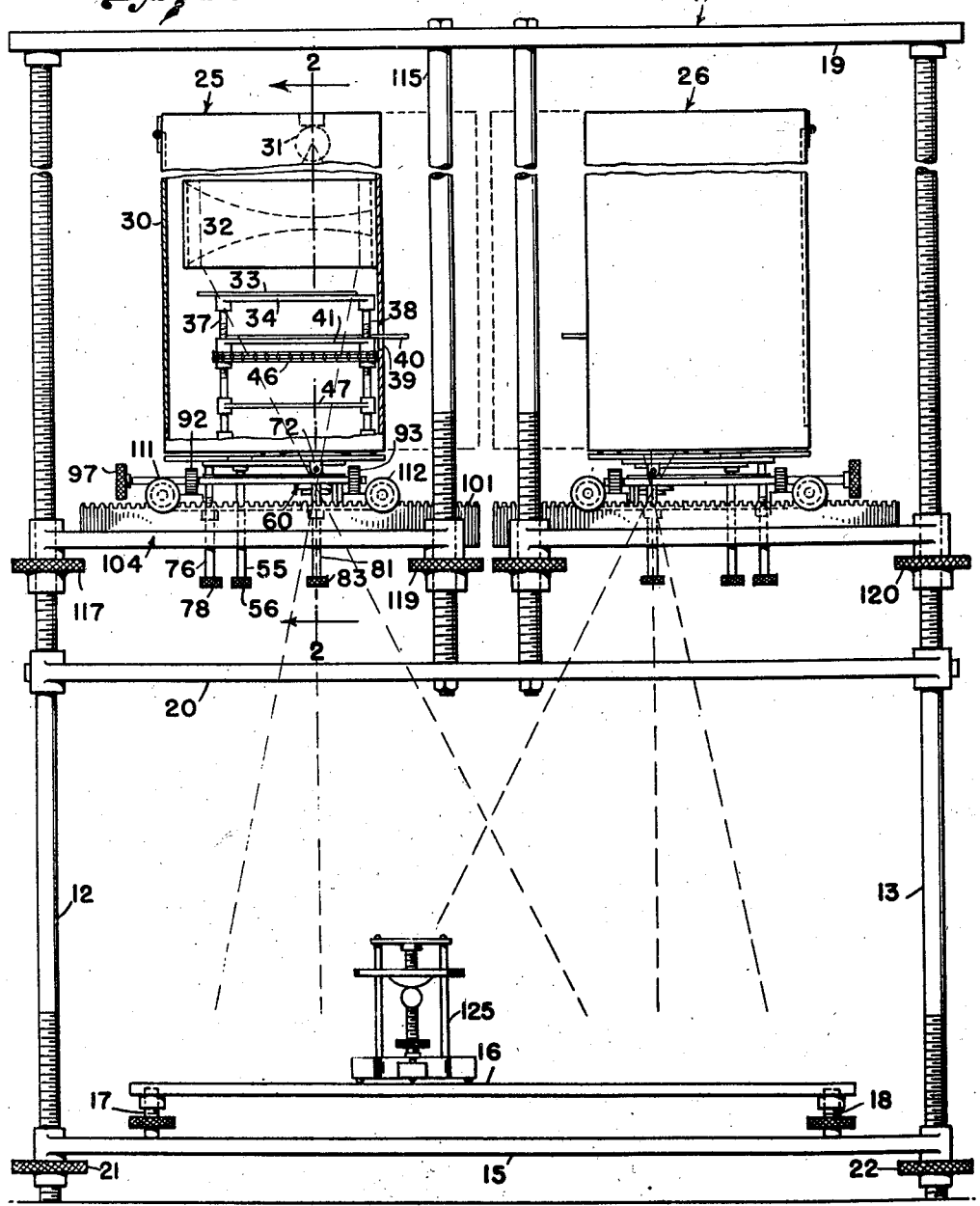

Inventor
H. T. KELSH

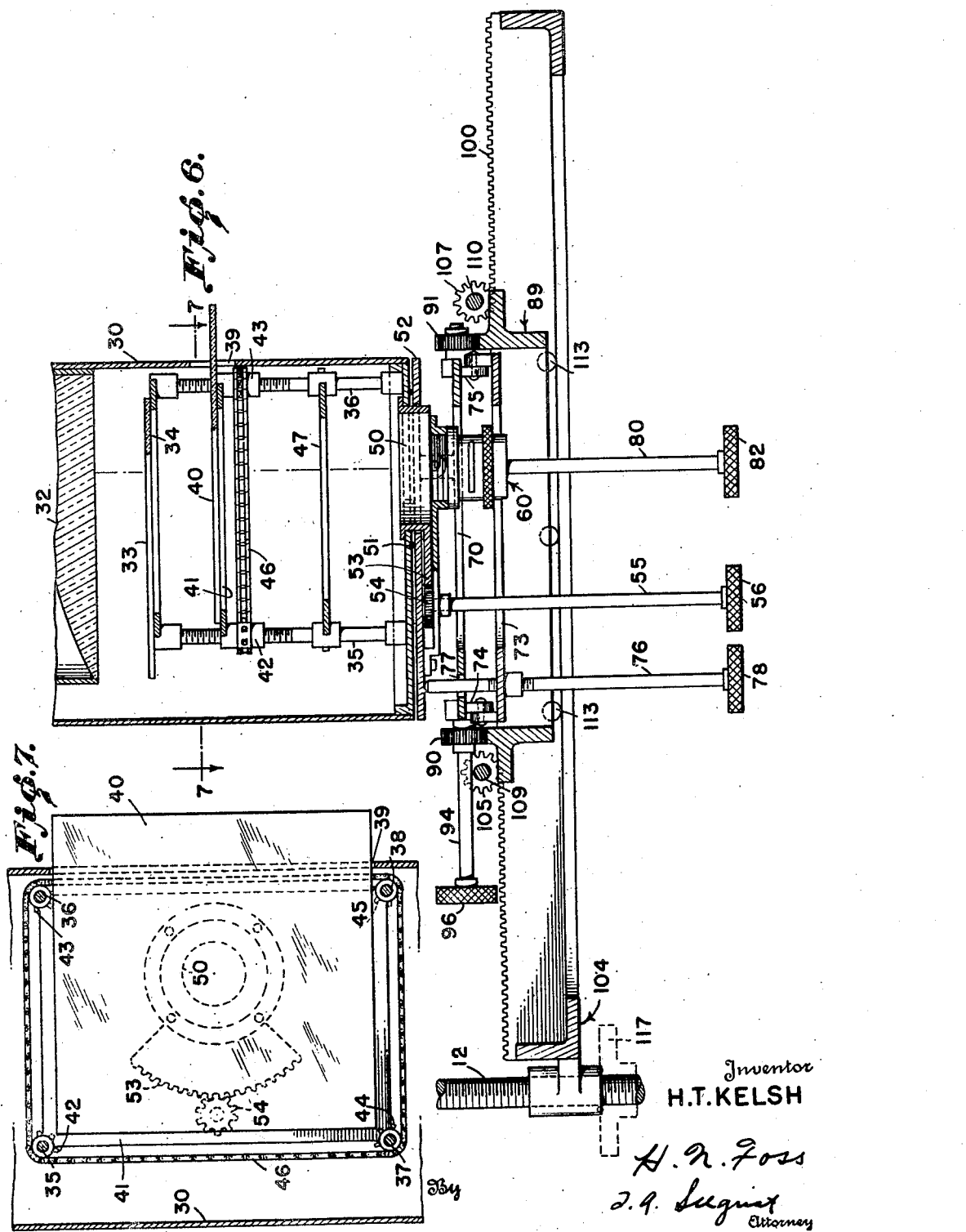

Oct. 12, 1948.          H. T. KELSH                2,451,031
              MAP MAKING AND PROJECTION INSTRUMENT
Filed May 15, 1946                          5 Sheets-Sheet 5

Inventor
H. T. KELSH

Patented Oct. 12, 1948

2,451,031

UNITED STATES PATENT OFFICE 2,451,031

MAP MAKING AND PROJECTION INSTRUMENT

Harry T. Kelsh, Washington, D. C.

Application May 15, 1946, Serial No. 669,772
3 Claims. (Cl. 88—24)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to photogrammetry, and has among its objects the provision of an instrument for making maps by stereophotogrammetric methods by projecting directly from a pair of overlapped, standard size (9" by 9") slides, either negatives obtained in taking overlapped snapshots of the terrain by aeroplane in the regular manner or positive transparency plates of a corresponding size printed from the negatives, and yet retaining convenient size of the instrument.

In general, the instrument is provided with a frame having two projection lanterns supported side by side on the frame for projecting images of a pair of consecutive slides on a screen. Light filtering devices such as complementary color filters or polarizers are so arranged that the superimposed images may be viewed through glasses colored to match the color filters or through polarizer glasses to show a stereoscopic model, so that drawing paper may be placed on the map table as a screen and the model cast on the drawing paper, from which topographic and planimetric maps may be drawn in the regular manner. The parts are so constructed and arranged, especially as to adjustment, that a model of degree of fineness required for work of this kind is obtained. The instrument may be supported on a table of convenient height.

For a detailed description of the invention, reference is made to the accompanying drawing, in which Figure 1 is a front elevation of the instrument with the front plate of the casing of the left hand projection lantern removed to show the internal parts.

Figure 2 is an enlarged section on the line 2—2 of Figure 1.

Figure 3 is a vertical section of the projecting lens.

Figure 6 is an enlarged section on the line 6—6 of Figure 5.

Figure 7 is a section on the line 7—7 of Figure 6.

Figure 4:
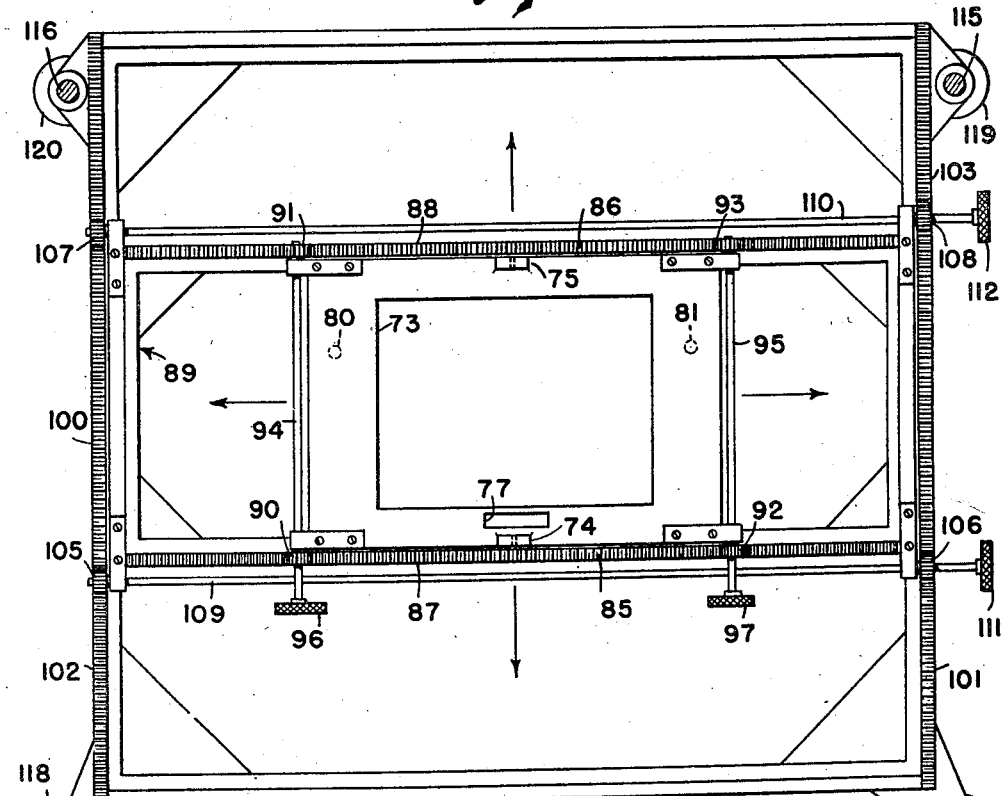
Figure 4 is a section on the line 4—4 of Figure 2 slightly reduced.
Figure 5:
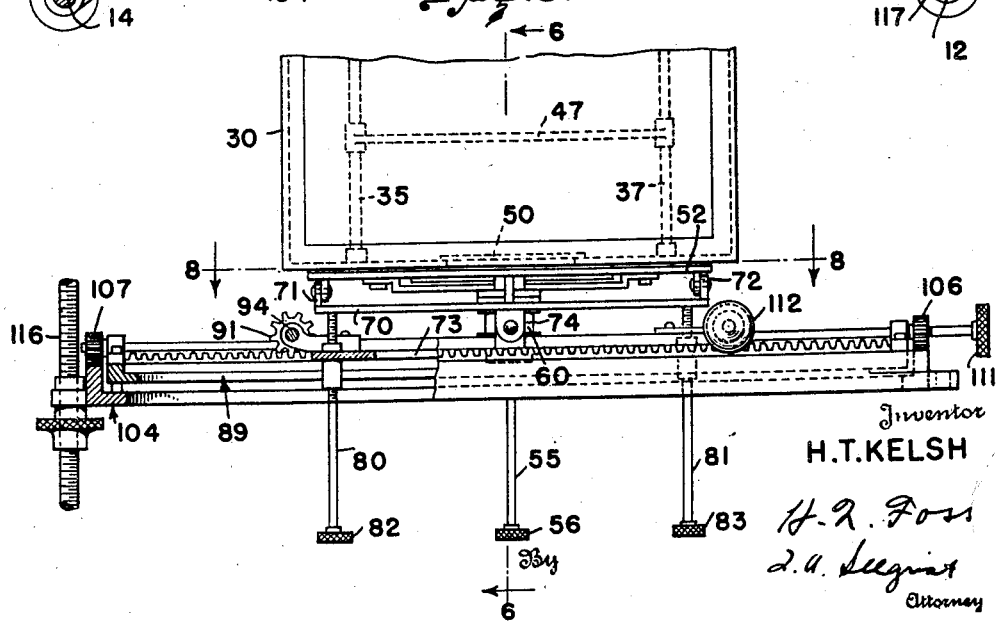
Figure 5 is a left side elevation of details of the left hand projection lantern with parts broken away and enlarged over Figure 1.
Figure 8:
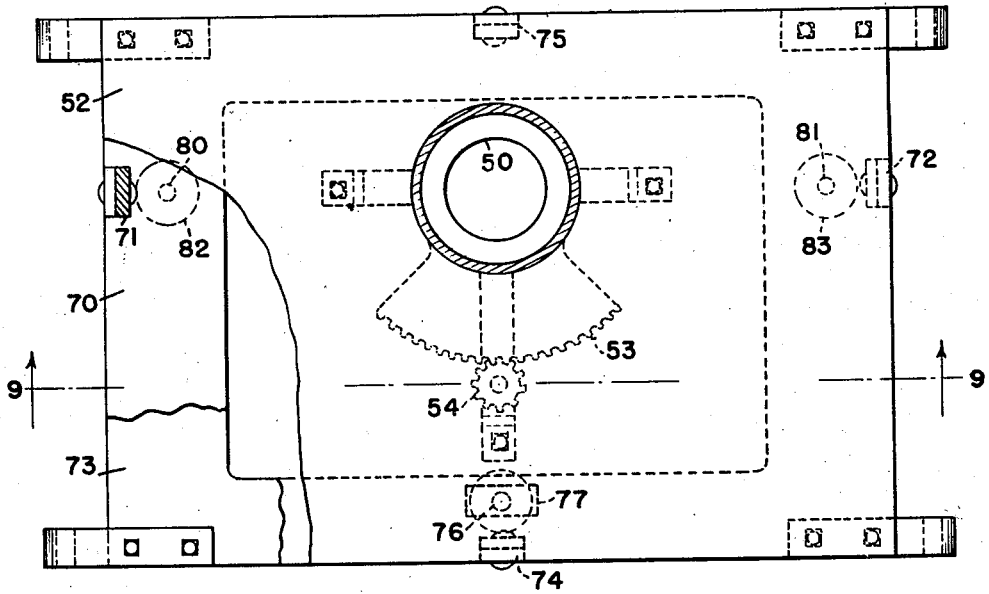
Figure 8 is an enlarged section on the line 8—8 of Figure 5.
Figure 9:
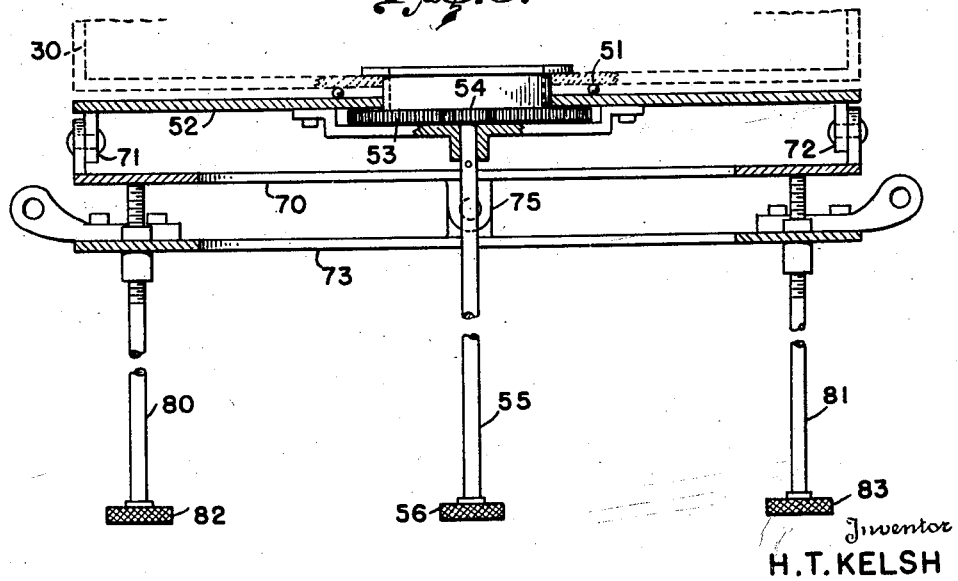
Figure 9 is a section on the line 9—9 of Figure 8.

The frame 11 is provided with four similar upright corner standards, the front left and right standards 12 and 13, respectively, being shown in Figure 1, the back left standard 14 being shown in Figure 4. A horizontal platform 15 is secured to the standards near their bottoms, and supports a horizontal map table 16 having adjustable feet at its corners, as shown at 17 and 18, for purposes of leveling the map table relative to the model cast on it. Frame cross members as shown at 19 and 20, Figure 1, similar ones being provided on all four sides of the instrument, are suitably secured to the corner standards. Platform 15 is vertically adjustable by being slidably secured to the corner standards and supported on nuts two of which are shown at 21 and 22 threaded on the standards.

A pair of projection lanterns 25 and 26 are suitably adjustably supported on the frame to cast superimposed images from a pair of consecutive slides onto the map table 16. These lanterns are similar except that one is arranged at the left hand and the other at the right hand, the position of the parts corresponding, and that the color filter in one is complementary to that of the other, or in case of the use of polarizers, one is normal to the other, and only one of these (lantern 25) and its support and adjustments will be described in detail.

Lantern 25 has a casing 30 provided with a door in its left hand side, if desired, and having a light 31 supported in the upper part of the casing. This light may be a conventional light bulb or any light of sufficient candle power and producing substantially a point source. A light condenser 32 of conventional design and large enough to condense sufficient light is located below the light to converge the light rays through a color filter or polarizer 33. This light filtering device rests on a rectangular filter support 34 which is carried by four upright bars 35, 36, 37 and 38, one at each corner of the rectangular support, the bars being secured at their bottom ends to the bottom of the casing. The casing is provided with an opening 39 in the wall adjacent casing 26 for insertion or removal of the slide 40 which rests on a rectangular slide support 41 slidably carried by the upright bars and vertically adjustable by means of sprockets 42, 43, 44 and 45 threaded on the upright bars 35, 36, 37 and 38, respectively, with the support 41 resting on the sprockets. A chain 46 is mounted on the sprockets so that the chain may be manually moved simultaneously to rotate all the sprockets. The purpose of this adjustment is to secure sharp focus at any degree of enlargement and permit the use of lenses of different focal lengths. The upright bars are braced with a rigid rectangular brace 47 fixed thereto.

Casing 30 is provided with a window 50 at its bottom, and is rotatably supported on ball bearings, as shown at 51, on a casing support 52. Rotatable adjustment of the casing and parts carried by it to compensate for crab of the areoplane in taking the snapshots is obtained by means of a gear 53 fixed to the casing 30, the gear meshing with a driving gear 54 fixed to a shaft 55 which is rotatably supported in casing support 52, the bottom end of shaft 55 being provided with a knurled hand knob 56 conveniently accessible to the operator.

A compound lens 60 is also carried by the casing support 52 in proper position relative to the light and light condenser, so that the light condenser is located between the lens and light source and converges the light at the nodal point of the lens, the converging light passing through the slide 40 which is carried between the condenser and the lens. Due to this construction, the lens is not rotated with the casing 30 in the adjustment for crab. This lens may be of conventional design, being provided with a pair of individual lenses 61 and 62, as shown in Figure 3. In addition, a gate 63 is provided in the lens holder 64 for receiving a color filter or polarizer 65 preferably supported at the nodal point of the lens, which may be used in lieu of the light filtering device 33. In case a polarizer is used in the lens, it will be noted, since the lens is not rotated with the casing, that once the polarizer of the two lanterns 25 and 26 are properly oriented normal to each other, rotation of the casing will not alter this orientation.

Lateral angular adjustment of lantern 25, that is, movement of its top to the right or left as viewed in Figure 1, to compensate for tip of the areoplane in taking the snapshots, is obtained by supporting the casing support 52 on a second rectangular support 70 by pivots, as shown at 71 and 72, and angular adjustment of the lantern normal to the lateral angular adjustment, that is, movement of its top forward or backward to compensate for tilt of the aeroplane, is obtained by supporting the second casing support 70 on a third rectangular casing support 73 by pivots, as shown at 74 or 75.

For the lateral angular adjustment, a screw 76 is threaded through the third rectangular support 73 and passes through an aperture 77 in support 70 and into abutment with support 52, the screw being provided at its lower end with a knurled hand knob 78 readily accessible to the operator. Forward rotation of screw 76 raises the left-hand side of the lantern, thus swinging it on its pivot 71 and 72. The lantern is off balance on its pivot, and when the screw is rotated in the opposite direction, gravity swings the lantern back.

For the adjustment normal to the lateral angular adjustment, two screws 80 and 81 are provided each threaded through an opposite side of the rectangular casing support 73 into abutment with support 70 and provided with knurled hand knobs 82 and 83. The lantern is not off balance on pivots 74 and 75, and screws 80 and 81 are simultaneously operated to make the adjustment.

Lantern 25 is also adjustable parallel to lantern 26, forwardly and backwardly, as viewed in Figure 1, to compensate for the angular adjustment which is normal to the lateral angular adjustment, thus to bring the image to the center of the map table. This is accomplished by providing horizontal parallel racks 85 and 86 on the sides 87 and 88 of a fourth rectangular lantern support 89, the third support 73 rotatably carrying sprockets 90, 91, 92 and 93 meshing with the racks as best shown in Figure 4. Sprockets 90 and 91 are fixed to a common shaft 94, and sprockets 92 and 93 are fixed to a common shaft 95, these shafts being provided at their ends with knurled knobs 96 and 97, respectively. Manual rotation of the shafts moves the lantern toward or away from the operator, as desired.

Lantern 25 is also adjustable toward and away from lantern 26 to the right or left, as viewed in Figure 1 to give the correct overlap of images for map scale purposes. This is accomplished by providing horizontal parallel racks 100 and 101 normal to racks 85 and 86 on sides 102 and 103 of a fifth rectangular lantern support 104, the fourth support 89 rotatably carrying sprockets 105, 106, 107 and 108 meshing with the racks 100 and 101, sprockets 105 and 106 being fixed to a common shaft 109 and sprockets 107 and 108 to a common shaft 110, the shafts being provided with knurled knobs 111 and 112, respectively. Roller bearings as at 113 are provided to relieve the weight from the sprockets 105, 106, 107 and 108, thus making operation of the adjustment easier.

Lantern 25 is also adjustable downwardly and upwardly, that is, toward and away from the map table, for change in enlargement ratio. This is accomplished by slidingly mounting the fifth support 104 at its left front and back corners on the standards 12 and 14 and at its right front and back corners on uprights 115 and 116 fixed between front and back frame cross members in the manner shown in Figure 1 relative to upright 115 and frame cross members 19 and 20. Knurled nuts 117, 118, 119 and 120 are threaded on the standards 12 and 14 and uprights 115 and 116, respectively, and the fifth support 104 rests on them. These nuts are rotated substantially simultaneously to make the adjustment, but due to a certain amount of play, each can be turned a limited amount without adjusting the others. However, for convenience, the nuts may be formed with sprockets and simultaneously rotated with a common chain similar to that described relative to chain 46.

The parts of the lantern are arranged so that the axis of the light condenser 32 is coincident with a line joining the light 31 and nodal point of the lens 60 and passes through the optical center of the slide 40 when the slide is properly positioned in the lantern. If condenser 32 is symmetrical, as is usual, its center should be positioned as nearly as possible midway between the nodal point of the lens and the point of the light source.

An important feature of the invention relates to the positioning of the parts of each lantern off-center, toward the corresponding parts of the other lantern, that is, relative to lantern 25, to the right of the center of the casing 30, as viewed in Figure 1. Condenser 32 is normally round, but as illustrated, a segment of the condenser has been removed so that it may be located to the right in the casing. This location of the parts results in slide 40 being only partially inserted in the casing. The portion of the slide projecting outside the casing is, however, the outside or non-overlap portion relative to its consecutive slide in the casing 26, since the images are cast on the screen by the lenses reversed to the slides, and it is unnecessary and undesirable that the non-overlap portion of the images be viewed in map compilation. The arrangement also provides for a larger range in adjustment of lanterns 25 and 26 toward each other before the lanterns come into abutment. Usually the portion of slide 40 projecting outside the casing will not contact the corresponding portion of the slide in the other casing when the lanterns are adjusted toward each other, since the other adjustments result in the slides being offset upwardly or downwardly relative to each other. However, in case a pair of consecutive slides do contact, the fault is readily remedied by merely shearing off the non-overlap portions of the slides before inserting them in the lanterns.

Another important feature of the invention relates to the vertical adjustability of the slide 40, that is, its adjustability toward or away from the lens 60. With this arrangement, the lens, light condenser and light may be in fixed position relative to each other, and sharp focus obtained by adjustment of the slide. Furthermore, if it be desired to use a lens of a different focal length, it is merely necessary to insert the desired lens in its position and the light from the condenser will converge at its nodal point. Proper focus is then obtained by adjustment of the slide.

Another important feature of the invention relates to the lens being non-rotatable when the casing and parts within it are rotated to compensate for crab. As before mentioned, this makes is possible to use polarizers in the lenses, and when the two polarizers are properly oriented normal to each other, the orientation is not disturbed by any of the other adjustments. Sometimes it is desirable to view a colored stereoscopic model, that is, with colored slides. In this case, it is necessary to use polarizers, since color screens block out colors. The arrangement of polarizers in the lenses is ideal for this purpose.

The instrument may be used as a projector for viewing a stereoscopic model by insertion of consecutive slides in the lanterns, adjusting the horizontal platform 15 and the slide supports 41 to give correct focus for the desired degree of enlargement, adjusting the distance between the lanterns to give correct overlap of images, and adjusting the lanterns for tilt, tip and crab to duplicate the positions of the camera in taking the two snapshots, thus to obtain a sharp stereoscopic model, which is viewed, of course, through colored glasses or polarizer glasses corresponding to the light-filtering devices used with the lanterns.

The instrument has its greatest utility, however, when used for map-making purposes, especially relative to the so-called slotted templet method for securing necessary radial point control, the slotted templet method in regular use being more fully explained in United States Department of Agriculture Miscellaneous Publication No. 404, entitled "The Slotted Templet Method for Controlling Maps Made from Aerial Photographs," by the present applicant.

The present instrument provides for making enlarged templets directly from the slides in a simple and accurate manner, the procedure being substantially as follows: Slides No. 1 and No. 2 made in flight, or any two consecutive slides at which the templet assembly is to begin, are placed one in each lantern in position so that its optical center is on the axis of the light condenser, a sheet of suitable material, such as cardboard, of which the templet is made, being placed on table 16. Adjustment is then made in the manner above described to give a sharp stereoscopic image when viewed through the glasses used. The model is then horizontalized by observing water surfaces or flat country or drainages and adjusting table 16 by means of adjustable feet 17 and 18 and/or adjusting for tip or tilt, thus to bring the model into an apparent horizontal position. Lantern 25, assuming this to be the lantern in which slide No. 1 has been placed, is then switched off, leaving merely the non-stereoscopic image of slide No. 2. The optical center is then marked on the cardboard sheet with a pencil or prick point by viewing the collimation marks cast from the slide. A standard plotting table, such as illustrated at 125, which has a vertically movable viewing table carrying a small illuminated aperture, which when viewed appears as a floating mark, is then placed on the table and moved around until a location is found where the floating mark appears to travel straight up and down with vertical change of the viewing table. This locates the nadir point which is then marked with the stylus of the standard plotting table. Suitable identifiable viewed objects a considerable distance from the nadir point are then picked as points for establishing the radial lines, and these are marked on the cardboard. The cardboard may then be removed and the radial lines drawn from the nadir point or from the isocenter (a point halfway between the nadir point and the optical center point) through the points selected for establishing the radial lines. The templet may then be completed in the regular manner.

Slide No. 1 is then removed and slide No. 2 is transferred from lantern 26 to lantern 25, which is then adjusted relative to elevation, tip and tilt to a position corresponding to that of lantern 26. Slide No. 3 is then placed in lantern 26 in proper optical position, the lights on both lanterns turned on, and lantern 26 is adjusted to give a sharp stereoscopic model. Lantern 25 is then switched off and the next templet made in the manner before described, using the same identifiable viewed objects on the left hand side as were used on the right hand side of the previous templet as points for establishing the radial lines and new identifiable viewed objects on the right hand side, the procedure being continued until all the desired templets are made.

A principal advantage in making templets by this procedure arises because the magnitude of error is reduced. Residual errors such as arise from marking or the unavoidable play of the pin used in the slot of the slotted templet, remain constant. Since the templet is enlarged, the magnitude or percentage of error is reduced.

Having thus described the invention, what is claimed is:

1. An instrument for making maps by stereo-photogrammetric methods by projecting directly from a pair of overlapped, standard size slides obtained in taking overlapped snapshots of the terrain by aeroplane, comprising a frame, two projection lanterns provided with casings supported side by side on the frame for projecting superimposed images from a pair of consecutive slides, and a map table on which a sheet of drawing paper may be placed on which the superimposed images are projected to show a stereoscopic model, each of said lanterns being provided with a lens for casting an image on the map table reversed to the slide, and, supported inside the casing, each of said lanterns being provided with substantially a point light source, with a light condenser located between the lens and light source with the axis of the light condenser coincident with a line adjoining the light source and nodal point of the lens for converging the light rays at the nodal point of the lens, and with a support for carrying the slide between the condenser and lens with the converging light passing through the slide and the axis of the light condenser passing through the optical center of the slide, said slide support being adjustable toward and away from the lens to obtain sharp focus, each of said lanterns being laterally angularly adjustable to compensate for tip of the aeroplane in taking the snapshots, angularly adjustable normal to the laterally angular adjustment to compensate for tilt of the aeroplane, adjustable parallel to each other, adjustable toward and away from each other, and adjustable toward and away from the map table, each of said lantern casings and carried parts being rotatably adjustable to compensate for crab of the aeroplane, the lens being so mounted as to be non-rotatable with the casing and being provided with means for supporting a polarizer oriented normal to the polarizer of the lens of the other lantern, the light, light condenser, and lens of each lantern being positioned off-center in the casing toward the corresponding parts of the other lantern, whereby when the slide is properly positioned in the casing its non-overlapped portion projects therefrom toward the other casing.

2. An instrument for viewing stereoscopic models by projecting a pair of consecutive slides obtained in taking overlapped snapshots of the terrain by aeroplane, comprising a pair of projection lanterns supported side by side, each of said lanterns being provided with a lens for casting an image on a screen, with substantially a point light source, with a light condenser located between the lens and light source for converging the light rays at the nodal point of the lens, and with a support for carrying a slide between the condenser and lens, the light source, light condenser and support being rotatably adjustable to compensate for crab of the aeroplane in taking the snapshots, the lens being so mounted as to be non-rotatable with the light source, light condenser and support and being provided with means for supporting a polarizer oriented normal to the polarizer of the lens in the other lantern, whereby colored slides may be used and images projected from the lantern on the screen in overlapped relation and viewed through polarizer glasses to show a colored stereoscopic model.

3. An instrument for making maps by stereophotogrammetric methods by projecting directly from a pair of overlapped, standard size slides obtained in taking overlapped snapshots of the terrain by aeroplane, comprising a frame, two projection lanterns provided with casings supported side by side on the frame for projecting superimposed images from a pair of consecutive slides, and a map table on which a sheet of drawing paper may be placed on which the superimposed images are projected to show a stereoscopic model, each of said lanterns being provided with a lens for casting an image on the map table reversed to the slide, and, supported inside the casing, each of said lanterns being provided with substantially a point light source, with a light condenser located between the lens and light source with the axis of the light condenser coincident with a line adjoining the light source and nodal point of the lens for converging the light rays at the nodal point of the lens, and with a support for carrying the slide between the condenser and lens with the converging light passing through the slide and the axis of the light condenser passing through the optical center of the slide, each of said lanterns being laterally angularly adjustable to compensate for tip of the aeroplane in taking the snapshots, angularly adjustable normal to the laterally angular adjustment to compensate for tilt of the aeroplane, adjustable parallel to each other, adjustable toward and away from each other, and adjustable toward and away from the map table, each of said lantern casings and carried parts being rotatably adjustable to compensate for crab of the aeroplane, the light, light condenser, and lens of each lantern being positioned off-center in the casing toward the corresponding parts of the other lantern, whereby when the slide is properly positioned in the casing its non-overlapped portion projects therefrom toward the other casing.

HARRY T. KELSH.

REFERENCES CITED

The following references are of record in the file of this patent:

UNITED STATES PATENTS

| Number | Name | Date |
| --- | --- | --- |
| 1,910,425 | Cahill | May 23, 1933 |
| 1,937,711 | Nelles et al. | Dec. 5, 1933 |
| 1,980,981 | Cooke | Nov. 20, 1934 |
| 2,200,594 | Diggins et al. | May 14, 1940 |
| 2,309,627 | Cooke et al. | Feb. 2, 1943 |
| 2,365,613 | Wibmer et al. | Dec. 19, 1944 |
| 2,411,155 | Gorn | Nov. 19, 1946 |